UNITED STATES PATENT OFFICE.

FRANCIS C. FRARY, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA.

ALUMINUM ALLOY.

15,407. Specification of Reissued Letters Patent. Reissued July 11, 1922.

No Drawing. Original No. 1,412,280, dated April 11, 1922, Serial No. 369,695, filed March 29, 1920. Application for reissue filed May 27, 1922. Serial No. 564,272.

*To all whom it may concern:*

Be it known that I, FRANCIS C. FRARY, a citizen of the United States, residing at Oakmont, in the county of Allegheny and State of Pennsylvania, have invented a new and useful Aluminum Alloy, of which the following is a specification.

This invention relates to aluminum alloys.

I have found that alkaline-earth metals, when added in suitable proportions to aluminum alloys, and particularly to those comprising aluminum, copper and magnesium and including or not manganese or a metal having similar action in alloys, impart to such alloys valuable qualities or properties.

By way of illustration, I will now describe my invention in its application to specific alloys, but it is to be understood that my invention is not limited in its application to the alloys herein specifically described, my invention in its true scope being set forth by the appended claims.

There are two well known aluminum alloys, the first comprising aluminum as its main constituent, about 4 per cent of copper and about 0.5 per cent of magnesium, and the other comprising these same constituents in substantially the proportions given with the addition of about 1 per cent of manganese. Both of these alloys are susceptible of a heat treatment, whereby their tensile strength may be increased approximately to that of mild steel, and their elongation by from 10 per cent to 20 per cent, measured on two-inch specimens. These alloys are therefore very valuable for certain uses, as will be readily understood by those skilled in the art. Both of these alloys are however very difficult and expensive to manufacture in sheet form, for the reason that they are decidedly "hot short"; that is to say, a great deal of trouble is experienced and much scrap is produced during the hot rolling of the ingot in the process of reducing the metal to a state from which a sheet may later be rolled, on account of the tendency of the metal to crack very badly. These cracks extend from the edge of the slab into the body thereof and make necessary extensive shearing of the edges, and in many cases the complete rejection of a considerable portion of the slabs is necessary. The application of these alloys to uses requiring that they be in sheet form is thus rendered extremely expensive if not prohibitive. These objections apply particularly to their use in the manufacture of various parts of dirigible balloons, aeroplanes and other air craft, as practically all the alloy to be used in the construction of these machines must first be rolled in the form of sheet.

By the addition to these alloys of a suitable proportion of an alkaline earth metal, calcium for example, in accordance with my invention, these alloys are greatly improved, and so far as I am aware novel alloys are obtained wherein a tendency seriously to crack during rolling, and particularly during the initial stages of hot rolling, is greatly reduced and in fact practically eliminated, and if other conditions are properly controlled, the necessity of scrapping ingots and slabs on account of excessive cracking is done away with. The novel alloys thus obtained possess all the desirable properties of the two types of alloys above described and at the same time are easier and therefore cheaper to work.

The addition of too large an amount of calcium is to be avoided, as otherwise the tensile strength obtained on heat treating is not as high as it should be. As a general rule, the amount of calcium added need not exceed 2 per cent, and less than one per cent may be used. For example in an aluminum alloy of which the main constituent is aluminum, and containing of copper not more than 6 per cent and of magnesium not more than 2 per cent, I preferably use not more than 2 per cent of calcium. In an alloy of which the main constituent is aluminum, and comprising of copper not more than 6 per cent, of magnesium not more than 2 per cent, and of manganese not more than 2 per cent, I also preferably use not more than 2 per cent of calcium. For a very practicable alloy I recommend an alloy containing about 4 per cent of copper, 0.6 to 1 per cent of manganese, from 0.3 to 1 per cent of magnesium, between 0.3 per cent and 0.6 per cent of calcium, and the balance aluminum.

The proportions of the constituents of the alloys given may be varied according to various requirements, without departing from the spirit of the invention, which is not to be considered as limited to the proportion given in any case.

Various well-known methods for the preparation of alloys may be used for the preparation of compositions embodying my invention. For example, for the preparation of the aluminum, copper, magnesium, manganese, calcium alloy herein described by way of illustration, I preferably make use of the following rich alloys: A rich copper alloy containing about 20 per cent of copper and about 80 per cent of aluminum, a rich manganese alloy containing about 8 per cent of manganese and about 92 per cent aluminum and a rich calcium alloy containing about 10 per cent calcium, about 10 per cent copper and about 80 per cent aluminum.

The aluminum used will preferably be commercially pure ingot aluminum preferably of a grade which contains less than 1 per cent total impurities and I use metallic magnesium of the usual commercial grade.

It is not strictly essential that the rich alloys above-mentioned have the composition given, but the compositions given are approximately those of the commercial alloys which are easily obtained and for this reason I prefer to use them. In preparing the alloy the proper amounts of each of the above materials necessary to produce the desired composition are weighed out. The ingot aluminum together with the rich copper and rich manganese alloys are charged into a crucible of suitable size and melted, care being taken that the temperature shall not rise above 1500° F. The crucible is then removed from the fire, the rich calcium alloy and metallic magnesium added and dissolved, the whole thoroughly stirred together and then returned to the fire to be reheated to the proper pouring temperture. When this is attained, the alloy is skimmed and poured into rolling ingots in the usual manner.

The elements or metals composing the alloys embodying my invention are effective constituents of said alloys.

While I have particularly emphasized the increased ease of hot rolling produced by the addition of an alkaline-earth metal, herein calcium, in accordance with my invention, there is evidence also of better rolling qualities of the alloy during the period of cold rolling which always follows the hot rolling operation.

The term alkaline-earth metal as used herein is intended to include the alkaline earth metals usually referred to by that term, with the exception of magnesium.

In carrying out my invention I preferably use what is known as commercially pure aluminum, which always contains small amounts of iron and silicon, and possibly other minor impurities. The word aluminum, however, wherever used in the specification and claims, is not to be understood as referring to any particular kind of aluminum, but on the contrary, it is to be interpreted in its broadest sense as including any aluminum suitable for making aluminum alloys.

Claims.

1. An alloy comprising aluminum, copper, magnesium and calcium, calcium not being the main constituent.

2. An alloy comprising aluminum, copper, magnesium, manganese and calcium, calcium not being the main constituent.

3. An alloy comprising aluminum, copper, magnesium and an alkaline-earth metal, the alkaline-earth metal not being the main constituent.

4. An alloy comprising aluminum, copper, magnesium, manganese and an alkaline-earth metal, the alkaline-earth metal not being the main constituent.

5. An alloy having as its main constituent aluminum and comprising lesser quantities of copper, manganese, magnesium and calcium.

6. An alloy having as its main constituent aluminum and comprising lesser quantities of copper, magnesium and calcium.

7. An alloy having as its main constituent aluminum and comprising lesser quantities of copper, manganese, magnesium and an alkaline-earth metal.

8. An alloy having as its main constituent aluminum and comprising lesser quantities of copper, magnesium and an alkali-earth metal.

9. An alloy consisting of aluminum, copper, magnesium and calcium, calcium not being the main constituent.

10. An alloy consisting of aluminum, copper, magnesium, manganese and calcium, calcium not being the main constituent.

11. An alloy comprising aluminum, copper, manganese, magnesium and calcium, having as its main constituent aluminum, the copper content not exceeding 6 per cent and the content of each of the metals manganese, magnesium and calcium not exceeding 2 per cent.

12. An alloy comprising aluminum, copper, magnesium and calcium, having as its main constituent aluminum, the copper content not exceeding 6 per cent and the content of each of the metals magnesium and calcium not exceeding 2 per cent.

13. An alloy consisting of aluminum, copper, manganese, magnesium and calcium, the copper content not exceeding 6 per cent and the content of each of the metals manganese, magnesium and calcium not exceeding 2 per cent.

14. An alloy consisting of aluminum, copper, magnesium and calcium, the copper content not exceeding 6 per cent and the content of each of the metals magnesium and calcium not exceeding 2 per cent.

15. An alloy comprising aluminum as its main constituent and copper, magnesium and calcium, the copper content being about 4 per cent and the content of each of the metals magnesium and calcium not exceeding 1 per cent.

16. An alloy comprising aluminum as its main constituent and copper, manganese, magnesium and calcium, the copper content being about 4 per cent and the content of each of the metals manganese, magnesium and calcium not exceeding 1 per cent.

17. An alloy having aluminum as its main constituent, and containing of copper about 4 per cent, of manganese from 0.6 per cent to 1 per cent, of magnesium from 0.3 per cent to 1 per cent and of calcium from 0.3 per cent to 0.6 per cent.

18. An alloy comprising aluminum, and an alkaline-earth metal and in which aluminum is the main constituent, the alkaline-earth metal content not exceeding about 2 per cent.

19. An alloy comprising aluminum and calcium in which aluminum is the main constituent and the calcium content does not exceed about 2 per cent.

20. An aluminum alloy having aluminum as its main constituent and containing from about 4 per cent to about 6 per cent of copper and from about 1 per cent to about 2 per sent of each of the metals, magnesium, manganese and calcium.

21. An aluminum alloy having as its main constituent aluminum and containing from about 4 per cent to about 6 per cent of copper and from about 1 per cent to about 2 per cent of each of the metals magnesium and calcium.

In testimony whereof, I have signed my name to this specification.

FRANCIS C. FRARY.